Dec. 3, 1968  M. A. GUETTEL  3,414,701
STUD WELDER CONTROL CIRCUIT
Filed Jan. 12, 1966
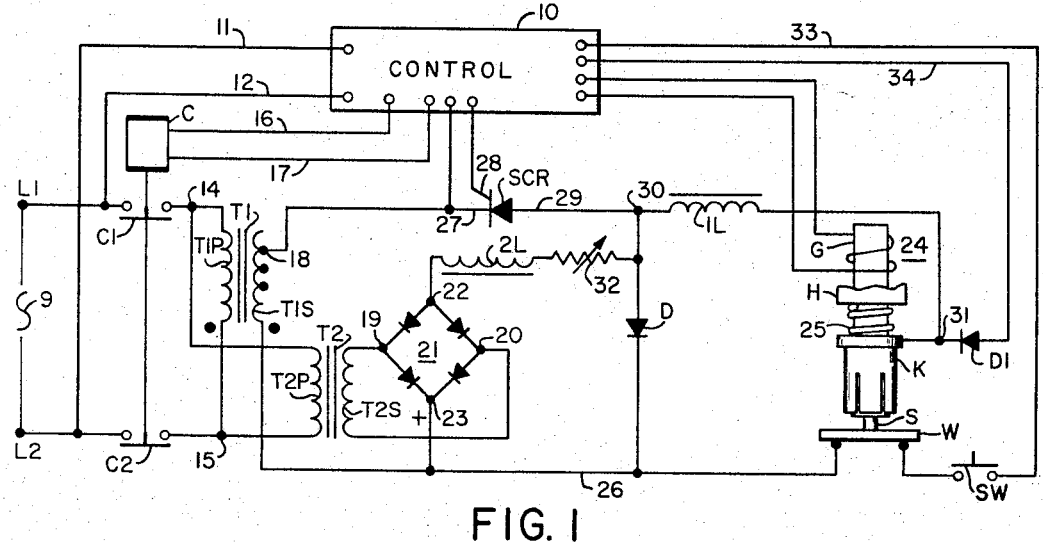
FIG. 1
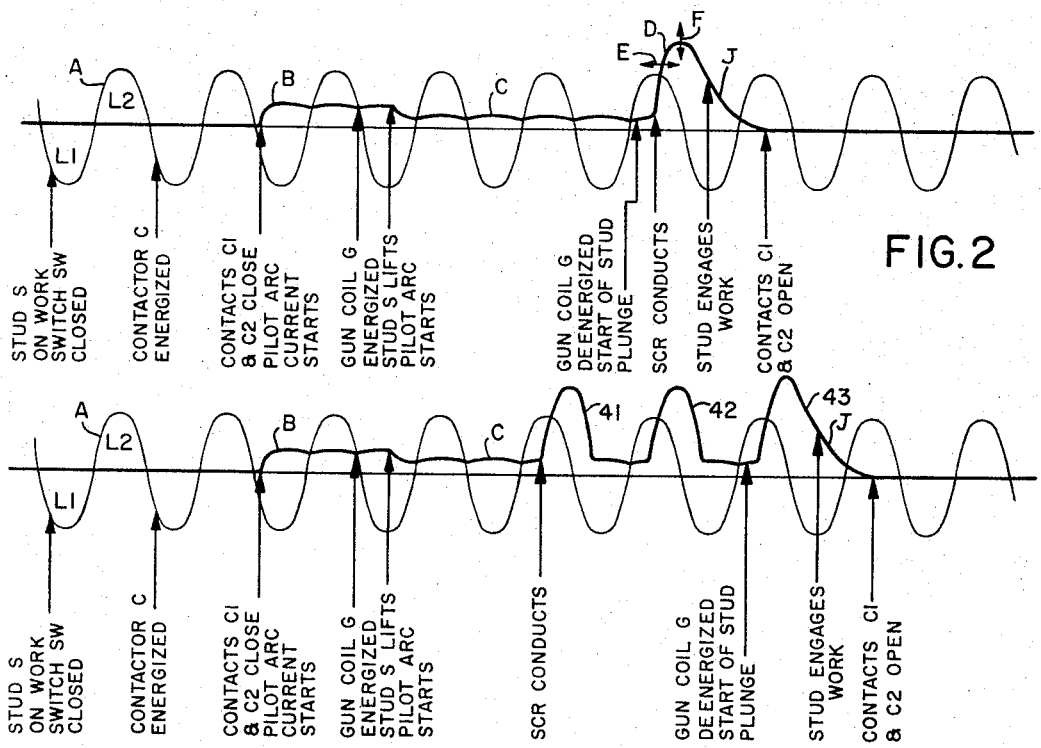
FIG. 2
FIG. 3
INVENTOR.
MARVIN A. GUETTEL
BY United States Patent Office 3,414,701
Patented Dec. 3, 1968

3,414,701
STUD WELDER CONTROL CIRCUIT
Marvin A. Guettel, Milwaukee, Wis., assignor to Square D Company, Park Ridge, Ill., a corporation of Michigan
Filed Jan. 12, 1966, Ser. No. 520,278
7 Claims. (Cl. 219—98)

This invention relates to an apparatus for welding studs to a work surface and is more particularly concerned with an apparatus which will deliver one or more half cycles of direct current from an alternating current source across a pilot arc between the stud and work surface and which apparatus includes an inductance and a diode that are arranged to prolong the flow of welding energy between the stud and the work surface after the stud is in its welded position on the work surface and the flow of the welding current from the source has ceased.

Conventionally, a continuous supply of direct current is frequently used to weld large studs to heavy metal parts in applications such as ocean-going ships, bridges, and the like. When the large studs are welded to the heavy metal parts, the excess heat which usually accompanies the welding operation may be tolerated, as the heavy metal parts will readily dissipate the heat without causing damage to either the studs or the work surface. However, when small size studs are welded to thin metal parts, the excess heat generated may be objectionable, as it may result in the distortion of the metal sheets or burning through of the thin metal parts. This heretofore has precluded the use of studs for the purpose of securing ornamental trim on motor vehicles and the like.

To overcome these deficiencies, it has been found that a condensor discharge system may be used to supply the weld energy between a stud and a work surface. When the condensor discharge system is employed, a single pulse of current of short duration is caused to flow across a pilot arc to cause a surface melting of the thin metal part and the end of the stud which is to be attached to the metal part. However, when the condensor bank is discharged to provide the welding current, the pulse of current which occurs is of extremely short duration and thus is insufficient to compensate for the variations in timing during which the stud is plunged to the weld position. To overcome this shortcoming, Paul A. Glorioso, in a United States Patent 3,136,880, which issued on June 9, 1964, suggested that as a resistor would consume too much energy, an inductance would be useful in increasing the discharge time of the capacitors. While the Glorioso system of welding has been used to successfully weld small size studs to relatively thin metal sheets, the Glorioso system inherently possesses deficiencies which will be hereinafter discussed.

While all of the dynamics of arc stud welding are not completely understood, it is known that an arc has a negative resistance characteristic and the voltage drop across an arc of given length is substantially constant. It is further known that the heating effect which causes the welding of the metal parts is a function of the product of the current and the arc voltage drop. Therefore as the voltage across the arc is constant, the weld energy becomes directly proportional to the current flow through the arc. It is also known that the heating effect of current flowing through a resistance, such as the welding cables and the stud holding apparatus, is equal to the product of the resistance of the circuit and the square of the current flow. It has also been discovered that when stainless steel studs are welded to galvanized metal, as is frequently employed in motor vehicles, a larger welding current is required than when studs are welded to mild steel. Thus when a large amount of welding current is required, as may be necessary to weld studs of larger size or studs to galvanized metal, when a capacitor discharge system is employed, the large single pulse of current which is required frequently results in excess heating of weld cables and the stud holding apparatus. Further, it is known that the energy required to form a satisfactory weld is equal to the product of the welding current, the arc voltage, and the time interval of welding current flow. Thus as the arc voltage and the time interval of welding current flow during a single pulse are substantially constant, when a single pulse of welding current is used and a large amount of weld energy is required, in certain applications the welding cables and welding gun may be excessively heated. Further, as the energy required to form a satisfactory weld is a function of the product of welding current, the arc voltage, and the time of welding current flow, the single pulse of welding current inherent in the capacitor discharge method of stud welding will limit the applications where the method may be successfully used.

It is an object of the present invention to provide an apparatus for welding studs of varying diameters to different types of metal surfaces with current that is supplied as one or more pulses of direct current from an alternating current source.

Accordingly, it is an object of the present invention to provide a stud welding apparatus which is capable of supplying one or more pulses of direct current from an alternating current source through an inductance across an arc between a stud and a metal part to which the stud is to be welded and to control the magnitude and duration of the pulses as well as to cause the stud to engage the metal part during the interval when energy stored in the inductance is being delivered through the stud and metal part.

Another object of the present invention is to provide a stud welding apparatus which is adapted to weld a large variety of different size studs to materials of various types and gages by accomplishing the welding with one or more pulses of direct current which are supplied by an alternating current source and to control the magnitude and duration of the pulses to fit the weld energy requirements of the materials being welded and to cause the stud to engage the surface to which the stud is to be welded prior to the end of the final welding current pulse and the flow of welding current to be continued after the termination of the final welding pulse by the energy which was previously stored in an inductance by the welding current which is released as current between the stud and surface through a circuit which includes a diode and excludes the source.

Further objects and features of the invention will be readily apparent to those skilled in the art from the specification and appended drawing illustrating certain preferred embodiments, in which:

FIG. 1 is a wiring diagram schematically showing a stud welding apparatus and circuit incorporating the features of the present invention.

FIGS. 2 and 3 illustrate the theoretical relationship of the currents and voltages and the sequence of operation of the circuit in FIG. 1, wherein FIGS. 2 and 3 respectively illustrate the operation of the circuit during the formation of a weld with a single half cycle pulse and multiple half cycle pulses of welding current flow.

In the drawings, a suitable source of alternating current, designated by the numeral 9, is connected to supply a pair of terminals L1 and L2 with alternating current. A control 10 is energized from the source 9 through a pair of leads 11 and 12 and the terminals L1 and L2. The terminal L1 is connected through a pair of normally open contacts C1 to a junction 14. Similarly, the terminal L2 is connected through a pair of normally open contacts C2 to a junction 15. The contacts C1 and C2 are moved into a circuit closing position by an electromagnet coil C of a contactor which is energized by the control 10 through leads designated as 16 and 17. A transformer T1 has a primary winding T1P connected across the junctions 14 and 15 and a secondary winding T1S having a plurality of taps indicated by the numeral 18. Similarly, a transformer T2 has a primary T2P connected to the junctions 14 and 15 and a secondary winding designated as T2S. The secondary T2S has a pair of output terminals connected to the input terminals 19 and 20 of a full wave bridge-type rectifier 21 which has output terminals designated as 22 and 23. The diodes within the bridge rectifier 21 are arranged so that the terminal 23 is positive in polarity relative to the terminal 22.

In FIG. 1 of the drawing, a stud welding gun 24 is diagrammatically shown. As stud welding guns are now old and well known, and the general operating principles and the actual physical structure employed for holding the stud, lifting the stud from the work piece and returning the stud to the work piece, are well understood, further explanation thereof is not believed necessary. The stud welding gun 24 has a solenoid coil G which is arranged when energized to move a stud holding chuck K. A stud S is shown as being releasably held by the chuck K in engagement with a surface of a work piece W, to which the stud S is to be welded. The stud welding gun 24 also has a return spring 25 interposed between the chuck K and a portion of a housing H for the stud welding gun 24. As is conventional, when the coil G is energized, the chuck K is moved against the force of the spring 25 to retract the stud S from the surface of the work W. Upon deenergization of the coil G, the spring 25 causes the chuck K and the stud S to be plunged toward the work W to a position where the stud S is pressed in firm engagement with the work W.

The secondary winding T1S has one side electrically connected through a lead 26 to work W. One of the taps 18 is connected to the cathode electrode 27 of a uni-directional conducting device, such as a silicon controlled rectifier SCR. The rectifier SCR has a gate electrode 28 connected to receive input signals from the control 10. The anode 29 of the rectifier SCR is connected to a junction 30 which in turn is connected through an inductance 1L to a junction 31. The junction 31, as indicated in the drawings, is shown as electrically connected through the chuck K, the stud S, and the work W to the lead 26. The output terminal 22 of the rectifier 21 is connected through an inductance 2L and a resistor 32 to the junction 30. The output terminal 23 is connected to the lead 26. Connected between the junction 30 and the lead 26 is a diode D which is poled to conduct current from the junction 30 to the lead 26 and prevent current flow in the reverse direction. The control 10 is connected through a lead 33 and the normally open contacts of an initiating switch SW to the work W. Additionally, the control 10 is connected through a lead 34 and a diode D1 to the junction 31.

With the foregoing in mind, the operation of the circuit shown in FIG. 1 will be described, reference being had to the curves shown in FIGS. 2 and 3. In FIG. 1, the alternating current supply 9 supplies an input voltage via leads 11 and 12 to the control 10. The control 10 is constructed in a manner known to those skilled in the art to operate in the following manner: provide an output signal to the coil C via the leads 16 and 17, receive an input signal through the switch SW via the leads 33 and 34, provide an output signal to the coil G of the stud gun 24, and provide an output signal between the gate 28 and cathode 27 of the rectifier SCR with all of the signals being in timed relation with each other to provide the operation which will now be described.

The alternating polarity voltage wave supplied by the source 9 is shown in FIGS. 2 and 3 as a curve A, wherein the half cycle designated as L1 indicates that the terminal 14 is positive in polarity relative to terminal 15 and the half cycle designated as L2 indicates that the terminal 15 is positive in polarity relative to the terminal 14. When it is desired to weld the stud S to the work W, the stud S is placed in the chuck K and the gun 24 is positioned so that the end of the stud S, which is to be welded to the work W, is in engagement with the work W. The source 9 is energized to provide the alternating polarity voltage wave A as indicated in FIGS. 2 and 3. The welding operation is initiated upon the closure of the switch SW which completes an initiating circuit including the lead 34, the diode D1, the junction 31, the chuck K, the stud S, the work W, the switch SW and the lead 33. After the initiating circuit is completed, the control 10 causes the coil C of the contactor to be energized at a random instant in time, which may occur approximately one cycle after the closure of switch SW, as indicated in FIGS. 2 and 3. After an interval, depending upon the pick-up characteristics of the contactor associated with coil C, the contacts C1 and C2 close, thereby completing a circuit from the source 9 to the primary windings T1P and T2P. The closure of the contacts C1 and C2 in FIGS. 2 and 3, is shown as occurring one cycle after the energization of the coil C. The energized winding T2P through the secondary winding T2S and the rectifier 21 supplies a full wave rectified direct current to be supplied as a pilot arc current between the engaging stud S and work W. This pilot arc current is indicated by a curve B in FIGS. 2 and 3. After a period of time which occurs approximately two cycles after the coil C was energized, the control 10 causes the gun coil G to be energized and the stud S to withdraw from the work W at an instant shown in FIGS. 2 and 3. The withdrawal of the stud S from the work causes the pilot arc to be initiated by the pilot arc current as indicated by a curve C in FIGS. 2 and 3. It is to be appreciated that when the stud S engages the work W, the pilot arc current will be larger than when the stud S is disengaged from the work W. This change in the pilot arc current is shown in FIGS. 2 and 3 by showing the curve C as having a smaller magnitude than the pilot arc current indicated by the curve B. A predetermined time after the initiation of the pilot arc, the control 10 causes the coil G to be de-energized and the spring 25 thereupon causes the stud S to begin its plunge toward the work W. The de-energization of the coil G is preferably initiated during an L2 half cycle and is shown as occurring approximately two cycles after the initiation of the pilot arc in FIG. 2 and as 3 cycles in FIG. 3. As the difference in operation of the control 10, shown in FIGS. 2 and 3, resides in the difference in the duration of the pilot arc and number of half cycles of welding current flow, the embodiment shown in FIG. 2 will now be described. During the half cycle when the stud S is plunging toward the work W, the control 10 supplies a suitable signal between the gate 28 and the cathode 27 which switches the rectifier SCR to a conductive state, causing welding current to flow across the pilot arc through the circuit which includes the lead 26, the work W, the pilot arc, the stud S, the chuck K, the junction 31, the inductance 1L, the junction 30, and the conducting rectifier SCR. This welding current flow, indicated by a curve D in FIG. 2, causes energy to be stored in the magnetic circuit of the inductance 1L while the adjacent surfaces of the stud S and the work W are heated to a welding temperature. At a predetermined instant during the half cycle when the rectifier SCR is conducting welding current, preferably after the flow of welding current has reached its maximum value, the stud S is caused to engage the work W and the control 10 discontinues the signals to the gate 28 whereby the rectifier SCR switches to a non-conductive state as the output voltage of the transformer secondary T1S causes the anode 29 to have a negative polarity. However, even though the rectifier SCR is no longer conducting, a welding current indicated by the portion of the curve D as J in FIGS. 2 and 3 continues to flow between the work W and the stud S. The current, indicated by the portion J, is supplied by the energy stored in the inductance 1L which is released as additional welding current through the circuit which includes the junction 30, the diode D, the work W, the stud S, the chuck K and the junction 31. This additional welding current supplies additional welding heat for the purpose of forming a more satisfactory welded connection between the stud S and the work W. After the stud is secured to the work and the flow of the inductive current from the inductance 1L has decreased to approximately zero, the control 10 causes the coil C to be de-energized and the contacts C1 and C2 open to de-energize the pilot arc circuit through the transformer T2.

It will be noted that the pilot arc circuit includes the resistor 32 and the inductance 2L. The inductance 2L is included to maintain the pilot arc during the periods of reversal in polarity of the output current of the transformer secondary winding T2S. The resistor 32 is used to adjust the intensity of the pilot arc. The diode D1 is included to prevent current flow from the pilot arc circuit and the welding current circuit from being impressed on the initiating switch circuit through leads 33 and 34. Also, the control 10 may be arranged to switch the rectifier SCR to its conductive state at any selected instant during an L2 half cycle as indicated by the horizontal arrow E in FIG. 1, to increase or decrease the amount of weld energy supplied between the stud S and the work W during the half cycle of welding current flow. Additionally, the taps 18 on the transformer secondary T1S, which may be used to increase or decrease the welding current as indicated by the vertical arrow F in FIG. 1, also provide a means of varying the weld current.

In FIG. 3, the control 10 is arranged to supply more than one-half cycle of welding current flow across the arc between the stud S and the work W. When the control 10 is adjusted to provide the welding current, as shown in FIG. 3, after the coil G is energized to cause the stud to lift from the work and the pilot arc to be formed as indicated by the curve C portion in FIG. 3, the control 10 supplies a suitable signal to the gate 28 to switch the rectifier SCR to its conductive state. After a selected number of half cycles of current flow which are indicated as two half cycles 41 and 42 in FIG. 3, the control 10 causes the gun coil G to be de-energized to begin the plunge of the stud toward the work in the manner previously indicated. The flow of weld current during the final half cycle, which is indicated as 43 in FIG. 3, may be of the same magnitude as the current flow during the previous half cycles 41 and 42 or it may be decreased or increased by varying the instant in time at which the rectifier SCR is switched to its conductive state during the half cycle 43. Again, as was described in connection with FIG. 2, during the final half cycle of welding current flow and after the stud S engages the work W, the inductance 1L continues to supply weld energy between the stud S and the work W in the same manner for the same purpose as was indicated in the description connected with the curves shown in FIG. 2.

An additional feature of the circuit as shown in FIG. 1, includes the position of the rectifier SCR in circuit with the secondary winding T1S. This arrangement permits the same polarity half cycles of welding current repeatedly to flow without magnetically saturating the iron of the transformer T1. If the rectifier SCR is included in circuit with the primary winding T1P, then the circuit would cause the iron of the transformer T1 to saturate when repeated one or more half cycles were supplied to make a plurality of welds.

While certain preferred embodiments of the invention have been specifically disclosed, it is understood that the invention is not limited thereto, as many variations will be readily apparent to those skilled in the art and the invention is to be given its broadest possible interpretation within the terms of the following claims:

What is claimed is:

1. A stud welding device comprising: a stud holding and retracting mechanism adapted to sequentially position a stud against a work surface to which the stud is to be welded, to thereafter retract the stud to produce a predetermined gap between the stud and work surface, and finally to return the stud to the weld position on the work surface, a source providing half cycles of alternating polarity current, means energized by the source providing full wave direct current to a pilot arc circuit between the stud and work surface, said pilot arc circuit current having a low value which will produce a pilot arc across the gap as the stud is retracted from the work surface, circuit elements comprising an inductance, a diode and a unidirectional conducting device having a control electrode for switching the device from a nonconducting to a conducting state in response to an input signal, a first circuit connecting the stud, the work surface, the inductance and the device in series across the source, a second circuit connecting the stud, the work surface, the inductance and the diode in a series circuit and control means adapted to supply signals to the pilot arc means, the stud holding and retracting mechanism and the control electrode for initiating the pilot arc current and retracting the stud during pilot arc current flow for establishing a pilot arc between the stud and work surface, supplying input signals to the control electrode during at least one half cycle concurrently with the pilot arc for establishing a welding current flow through the first circuit and simultaneously storing electrical energy in the inductance, and finally terminating the input signals and returning the stud to the weld position during said one half cycle for releasing the electrical energy stored in the inductance through the second circuit to provide a current flow between the stud and work surface when the stud is in the weld position for a time interval subsequent to the termination of current flow through the first circuit.

2. The combination as recited in claim 1 wherein the control means supplies input signals to the control electrode during more than one half cycle for supplying more than one half cycle of welding current.

3. The combination as recited in claim 1 wherein the unidirectional conducting device is a silicon controlled rectifier.

4. The combination as recited in claim 2 wherein each of the half cycles have the same polarity.

5. The combination as recited in claim 1 which includes an initiating circuit having a portion thereof connected in a series circuit with the stud and work surface and a diode poled to prevent current flow from the pilot arc circuit through the initiating circuit.

6. The combination as recited in claim 1 wherein the pilot arc current is supplied through a full wave rectifying bridge from the source.

7. The combination as recited in claim 1 wherein the control means is adapted to vary the instant during each half cycle when the input signal is supplied to the control electrode for varying the flow of welding current during each half cycle.

References Cited

UNITED STATES PATENTS 3,136,880  6/1964  Glorioso _____ 219—98
3,291,958  12/1966  Glorioso _____ 219—98

RICHARD M. WOOD, *Primary Examiner.*

C. CHADD, *Assistant Examiner.*